United States Patent
Yang et al.

(10) Patent No.: US 10,439,524 B1
(45) Date of Patent: Oct. 8, 2019

(54) MOTOR DRIVING CIRCUIT AND METHOD THEREOF

(71) Applicant: ANPEC ELECTRONICS CORPORATION, Hsinchu (TW)

(72) Inventors: Chia-Tai Yang, Tainan (TW); Kun-Min Chen, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 16/105,637

(22) Filed: Aug. 20, 2018

(30) Foreign Application Priority Data

May 25, 2018 (TW) .............................. 107117950 A (51) Int. Cl.
H02K 29/08 (2006.01)
H02P 6/15 (2016.01)

(52) U.S. Cl.
CPC .............. *H02P 6/157* (2016.02); *H02K 29/08* (2013.01)

(58) Field of Classification Search
CPC ............ H02P 6/157; H02P 6/28; H02K 29/08
USPC ......................................... 318/400.2, 400.14
See application file for complete search history.

(56) References Cited

U.S. PATENT DOCUMENTS

| | | | | |
|---|---|---|---|---|
| 2009/0102437 A1* | 4/2009 | Nakagawa | ................ | H02P 9/48 323/217 |
| 2012/0081050 A1* | 4/2012 | Dai | ........................ | H02P 25/04 318/400.14 |
| 2017/0222582 A1* | 8/2017 | Suzuki | .................... | H02P 6/157 |
| 2018/0183368 A1* | 6/2018 | Murakami | .............. | H02P 6/182 |

* cited by examiner

*Primary Examiner* — Kawing Chan
(74) *Attorney, Agent, or Firm* — Li & Cai Intellectual Property (USA) Office (57) ABSTRACT

A motor driving circuit includes a Hall sensor, an offset detecting circuit, a driving circuit and a back EMF zero point detector. The Hall sensor generates a Hall signal group, the offset detecting circuit detects the first phase changing point of the Hall signal group, and the driving circuit generates the initial phase changing signal in the pre-operation mode according to the Hall signal group. In the correction mode, the driving circuit stops outputting the initial phase changing signal, the back EMF zero detector detects the back EMF zero point, and outputs the back EMF zero point signal. The offset detecting circuit detects a phase difference between the first phase changing point and back EMF zero point, and determines a difference value between the phase difference and a predetermined phase difference. Then, the phase of the Hall signal group is adjusted according to the difference value.

10 Claims, 7 Drawing Sheets

MOTOR DRIVING CIRCUIT AND METHOD THEREOF

CROSS-REFERENCE TO RELATED PATENT APPLICATION

This application claims the benefit of priority to Taiwan Patent Application No. 107117950, filed on May 25, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor driving circuit and a motor driving method, and more particularly to a motor driving circuit and a motor driving method capable of automatically adjusting the phase of the Hall signal according to a phase difference between a back electromotive force (EMF) zero point and a Hall signal to eliminate the offset in the Hall sensor.

BACKGROUND OF THE DISCLOSURE

A brushless structure is one of the major features of a DC brushless motor which in principle generates no noises. The noises include not only mechanical noises, but also electrical noises. Moreover, as the brushless motor negates the contacting between certain components therein, it is easier to make a high-speed rotary motor by using such a motor.

When the DC brushless motor is driven, a Hall signal output from a Hall element is often used as the starting point of a sine wave. Ideally, when the Hall element is arranged with no mounting tolerance, no phase difference exists between a back EMF, a driving voltage and the Hall signal, and between the driving current and the Hall signal.

However, in an actual manufacturing process, the positional tolerance of the Hall element affects the quality of a motor manufactured in mass production. For example, while the Hall signal is in-phase with the driving voltage, due to the mounting tolerance of the Hall element, the phase of the back EMF will lead that of the driving voltage, which will cause an increase in the feedback current and undesired power consumption by the brushless DC motor, and thus reduce the efficiency of the DC brushless motor.

Therefore, it is very important to improve the current circuit design with a motor driving circuit capable of automatic adjustment to eliminate the offset of the Hall element.

SUMMARY OF THE DISCLOSURE

One aspect of the present disclosure provides a motor driving circuit electrically connected to a motor, and the motor driving circuit includes a Hall sensor, an offset detecting circuit, a driving circuit, and a back EMF zero point detector. The Hall sensor is configured to detect a position of a rotor of the motor and generate a Hall signal group. The offset detecting circuit is configured to receive the Hall signal group, and to detect a first phase changing point of the Hall signal group. The driving circuit is electrically connected to the offset detecting circuit, and connected to the motor through an inverter circuit. The driving circuit is configured to receive the Hall signal group, and to generate an initial phase changing signal according to the Hall signal group. The driving circuit is configured to output the initial phase changing signal through the inverter circuit in a pre-operation mode to control a phase change state of the motor to cause the motor to operate according to the initial phase changing signal. The back EMF zero point detector is electrically connected to the offset detecting circuit and the motor, and is configured to receive a back EMF signal group of the motor. In the calibration mode, the offset detecting circuit further detects a phase difference between the first phase changing point and the back EMF zero point according to the first phase changing point and the back EMF zero point signal, determines a difference value between the phase difference and a predetermined phase difference, and then adjusts the phase of the Hall signal group according to the difference value to generate a corrected Hall signal group to output to the driving circuit.

Another aspect of the present disclosure provides a motor driving method for driving a motor, including: configuring a Hall sensor to detect a position of a rotor of the motor and to generate a Hall signal group; configuring an offset detecting circuit to receive the Hall signal group and detect a first phase changing point of the Hall signal group; configuring a driving circuit to receive the Hall signal group, and to generate an initial phase changing signal according to the Hall signal group; configuring the driving circuit to output the initial phase changing signal through an inverter circuit in a pre-operation mode, to control a phase change state of the motor to operate the motor according to the initial phase changing signal; configuring a back EMF zero point detector to receive a back EMF signal group of the motor; configuring the driving circuit to stop outputting the initial phase changing signal in a calibration mode after the pre-operation mode, and configuring the back EMF zero point detector to detect a back EMF zero point of the back EMF signal group, and to output a back EMF zero point signal; configuring the offset detecting circuit to detect a phase difference between the first phase changing point and the back EMF zero point according to the first phase changing point and the back EMF zero point signal; configuring the offset detecting circuit to determine a difference value between the phase difference and a predetermined phase difference, and then adjusting the phase of the Hall signal group according to the difference value to generate a corrected Hall signal group to output to the driving circuit; and configuring the driving circuit to generate a corrected phase changing signal according to the corrected Hall signal group to drive the motor.

Therefore, the motor driving circuit provided by the present disclosure can automatically adjust the phase of the Hall signal to eliminate the Hall element offset and reduce the feedback current according to the phase difference between the back EMF zero point and the Hall signal through the technical features of "offset detecting circuit" and the "back EMF zero point detector," thereby reducing the power consumption of a DC brushless motor and improving the efficiency of the motor. Moreover, the present disclosure is applicable to different motor configurations, such as single-phase and three-phase motors.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The embodiments of the present disclosure relating to the "motor driving circuit and method" are described by way of specific embodiments, and those skilled in the art can understand the advantages and effects from the present disclosure. The present disclosure can be implemented or applied in various other specific embodiments, and various modifications and changes can be made without departing from the spirit and scope of the present disclosure. In addition, the drawings of the present disclosure are merely illustrative and are not intended to be stated in the actual size. The following embodiments will further explain the related technical content of the present disclosure, but the disclosure is not intended to limit the scope of the present disclosure.

It should be understood that, although the terms "first", "second", "third", and the like may be used herein to describe various elements or signals, these elements or signals are not limited by these terms. These terms are primarily used to distinguish one element from another or one signal from another. In addition, the term "or" as used herein may include a combination of any one or more of the associated listed items, depending on the actual situation.

First Embodiment

Figure 1:
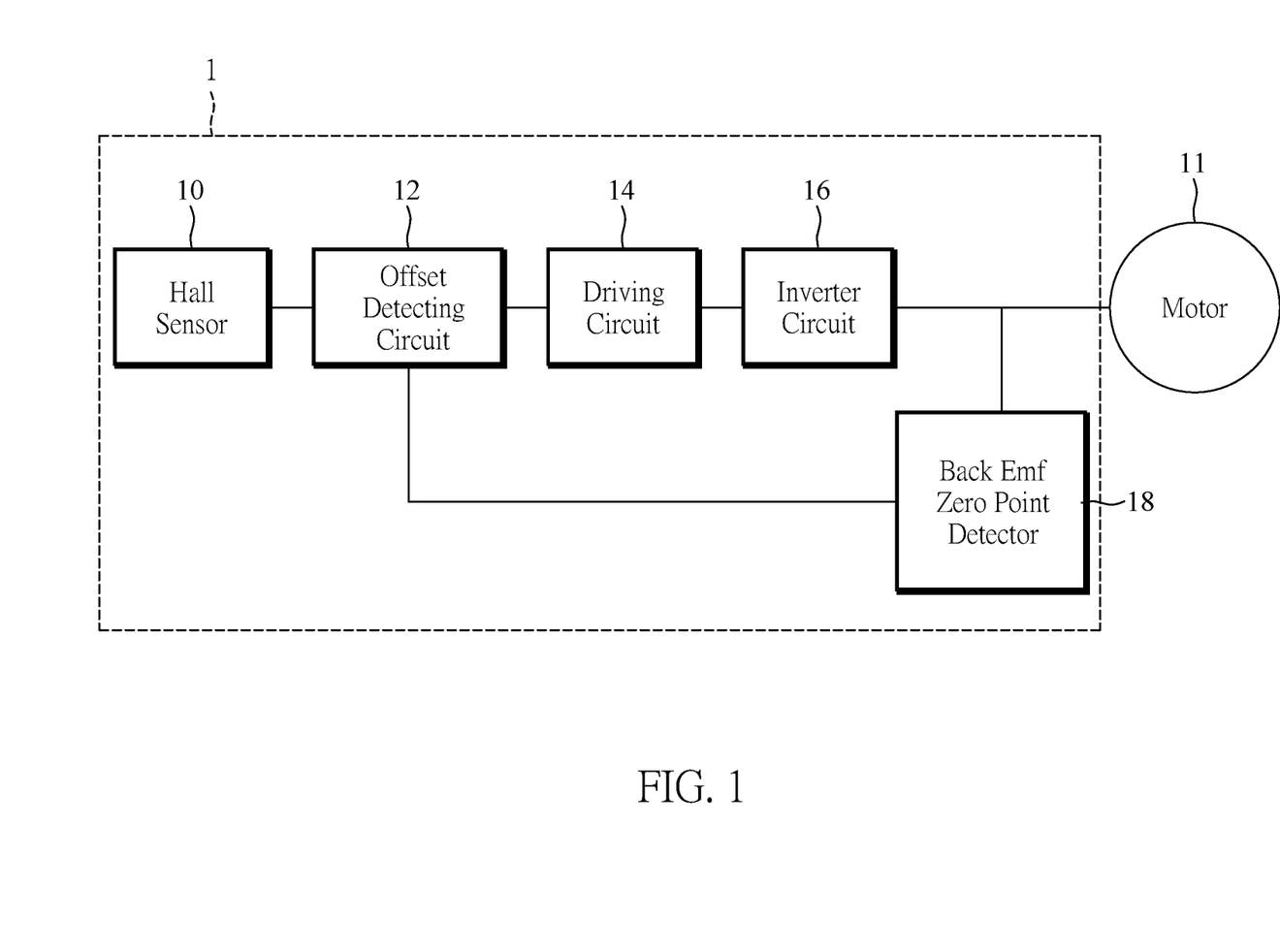
FIG. 1 is a schematic circuit diagram of a motor driving circuit of a first embodiment of the present disclosure.
Figure 2:
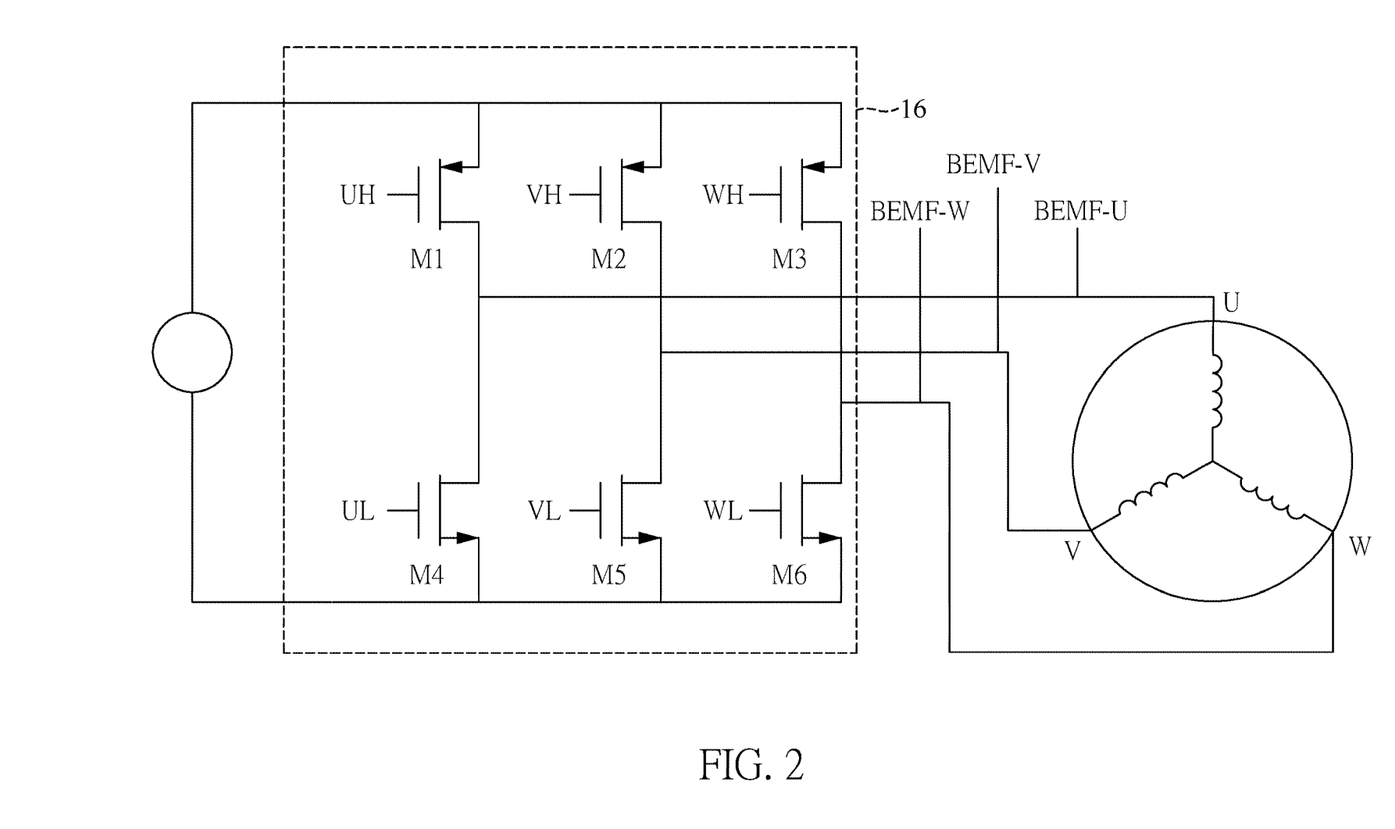
FIG. 2 is a schematic circuit diagram of a three-phase motor and an inverter circuit.
Figure 3:
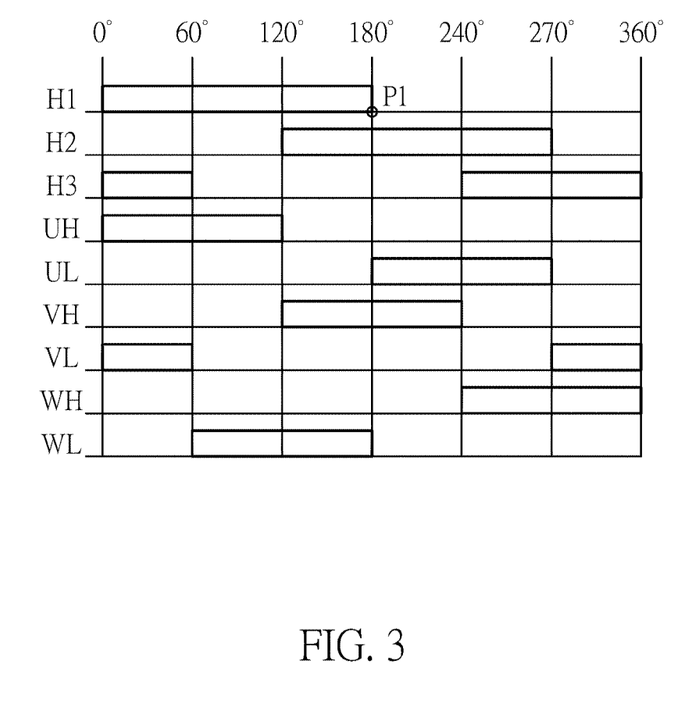
FIG. 3 is a schematic diagram showing six-step square waves being controlled and switched by the signal(s) of a Hall sensor.

Reference is now made to FIGS. 1 to 3. FIG. 1 is a schematic circuit diagram of a motor driving circuit of a first embodiment of the present disclosure. FIG. 2 is a schematic circuit diagram of a three-phase motor and the inverter circuit. FIG. 3 is a schematic diagram of six-step square waves controlled and switched by the signal(s) of a Hall sensor. As shown in FIG. 1, the first embodiment of the present disclosure provides a motor driving circuit 1 for driving a motor 11. The motor driving circuit 1 includes a Hall sensor 10, an offset detecting circuit 12, a driving circuit 14, an inverter circuit 16 and a back EMF zero point detector 18.

Hall sensor 10 can be disposed adjacent to the motor 11, and can be configured to sense changes in the magnetic field of the motor 11 and to determine the rotor position of the motor 11, thereby generating a Hall signal group. Take a three-phase motor as an example, as shown in FIGS. 2 and 3, the Hall signal group can include a first Hall signal H1, a second Hall signal H2, and a third Hall signal H3. Next, the driving circuit 14 receives the Hall signal group to output switching signals UH, UL, VH, VL, WH, WL to control the ON or OFF states of the respective switching elements in the inverter circuit 16.

Next, reference is made to FIG. 2. In general, the motor 11 has three windings, which include a U coil winding U, a V coil winding V, and a W coil winding W. As can be seen from the circuit architecture of FIG. 2, the inverter circuit 16 includes transistors M1, M2, M3, M4, M5, and M6. When the transistor M1 and the transistor M5 are turned on, the current for operating the motor 11 flows from the power supply terminal, through the transistor M1, the U coil winding U and the V coil winding V of the motor 11, and then flows to the ground terminal through the transistor M5.

Generally, the currents for controlling a normal motor flows from the U coil winding U to the V coil winding V, from the U coil winding U to the W coil winding W, and then the direction of the currents changes, that is, flowing from the V coil winding V to the W coil winding W, from the V coil winding V to the U coil winding U, and then from V coil winding V to the W coil winding W. Next, other phase changes continuously control the flow direction of the current of U coil windings U, V coil winding V, and the W coil winding W, thereby controlling the rotation direction of the motor 11. The phase change of the motor 11 is described in the above embodiment, however, is only one kind of motor phase change controlling, and other phase change controlling methods for the motor 11 are not described herein for brevity.

With further reference to FIG. 3, the rotor position information is measured using, for example, a digital Hall sensor having a resolution of a 60-degree electrical angle, thereby obtaining coarse rotor position information generated after the motor is rotated.

Figure 4:
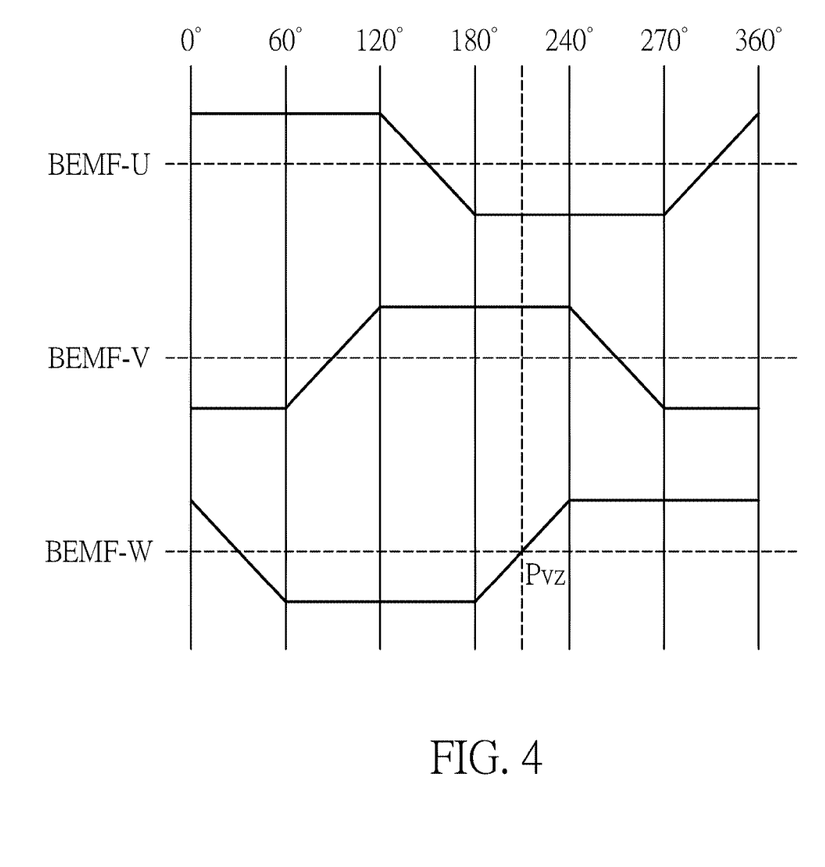
FIG. 4 is a schematic back-EMF diagram showing that the six step square waves in FIG. 3 are driven.

Taking the six-step square wave driving method as an example, the phase changing of the three-phase motor can be determined according to the phase changing point in the Hall signal group. For example, if the first Hall signal H1 has a falling edge at 180 degrees, it can be regarded as a first phase changing point P1. At this time, an interval between the first phase changing point P1 and a point that is 60 degrees later from the first phase changing point P1 can be taken as a reference interval. As shown in FIG. 4, a zero-crossing point appears in the back EMF BEMF-W corresponding to the W coil winding W in the reference interval.

Ideally, when the Hall sensor 10 is arranged with no mounting tolerance, no phase difference exists between the back EMF, the driving voltage and the Hall signal, and between the driving current and the Hall signal.

However, in an actual manufacturing process, the positional tolerance of the Hall element affects the quality of the motor manufactured in mass production. For example, while the Hall signal is in-phase with the driving voltage, due to the mounting tolerance of the Hall element, the phase of the back EMF will lead that of the driving voltage, which will cause an increase in the feedback current, and undesired power consumption by the brushless DC motor, and thus reduce the efficiency of the DC brushless motor.

Accordingly, the motor driving circuit 1 of the present disclosure further includes the offset detecting circuit 12 and the back EMF zero point detector 18. The offset detecting circuit 14 is electrically connected between the Hall sensor 10 and the driving circuit 14, and is configured to receive the Hall signal group and detect the first phase changing point P1 of the Hall signal group. The Hall signal group can include a first Hall signal H1, a second Hall signal H2, and a third Hall signal H3, and the first phase changing point P1 can correspond to a position where a falling edge occurs in the first Hall signal H1.

Figure 5:
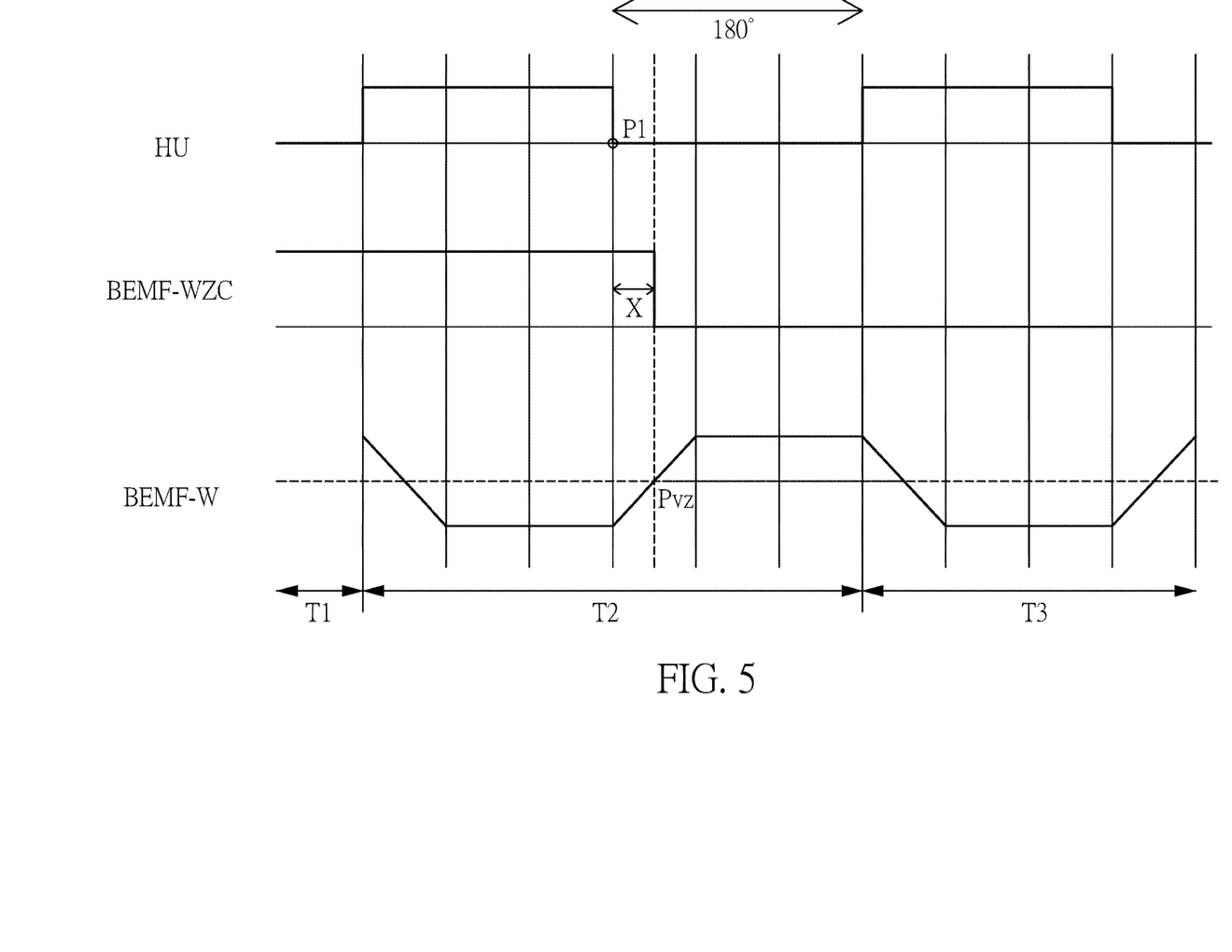
FIG. 5 is a diagram showing the relationship between a Hall signal, a back EMF signal and a back EMF zero detection signal of the three-phase motor.

Reference is further made to FIG. 5, which is a diagram showing the relationship between the Hall signal, the back EMF signal and the back EMF zero detection signal of the three-phase motor. In detail, the motor driving circuit 1 of the present disclosure can detect the phase offset required for correction by sequentially entering the pre-operation mode and the correction mode. In the pre-operation mode, that is, in the interval T1, the driving circuit 14 outputs the aforementioned initial phase changing signal through the inverter circuit 16 to control the phase change state of the motor 11. At this time, the motor 11 operates in accordance with the initial phase changing signal and generates back EMFs on the coil windings of the respective phases.

Next, the motor driving circuit 1 enters the correction mode after the pre-operation mode, i.e. in the interval T2, the driving circuit 14 stops outputting the initial phase changing signal, in other words, all of the coil windings are floating, at which point the motor 11 still continues inertial operation, the back EMF zero point detector 18 receives the back EMF signal group, as shown in FIGS. 1 and 2, the back EMF signal group includes a back EMF BEMF-U corresponding to U coil winding U, a back EMF BEMF-V corresponding to V coil winding V, and a back EMF BEMF-W corresponding to W coil winding W. The back EMF zero point detector 18 detects the back EMF zero point Pvz of the back EMF signal group and outputs a back EMF zero point signal. In this embodiment, the Hall signal HU corresponds to the first Hall signal H1. After the first phase changing point P1, according to the configuration of the Hall sensor 10 in the three-phase motor, a back EMF zero point Pvz is expected to appear in the back EMF signal BEMF-W, as shown in FIG. 4 and FIG. 5.

Here, after detecting the back EMF zero point Pvz of the back EMF signal group, the back EMF zero point detector 18 generates a back EMF zero point signal BEMF-WZC corresponding to the W coil winding W. As shown in FIG. 5, the offset detecting circuit 12 further detects the phase difference X between the first phase changing point P1 and the back EMF zero point Pvz according to the first changing point P1 and the back EMF zero point signal BEMF-WZC, and determines a difference value between the phase difference X and the predetermined phase difference. The motor 11 is then returned to the normal operation mode, that is, in the interval T3, and the phase of the Hall signal group is adjusted according to the difference value to generate the corrected Hall signal group to output to the driving circuit 14.

For example, in this three-phase motor configuration, as shown in FIGS. 3 and 4, the ideal back EMF zero point Pvz should appear at 30 degrees after the first phase changing point P1. In other words, the predetermined phase difference is 30 degrees. Given that the phase difference X detected at this time is 25 degrees, it is determined that the difference value is 5 degrees, which represents that the back EMF signal BEMF-W is 5 degrees ahead, and the offset detecting circuit 12 further adjusts the Hall signal according to the difference value. For example, the first Hall signal H1, the second Hall signal H2, and the third Hall signal H3 can be adjust by 5 degrees, so that the position of the first phase changing point P1 can be aligned with the back EMF zero point detected in the correction mode, thereby generating the corrected Hall signal group. The driving circuit 14 further generates a corrected phase changing signal to drive the motor 11 based on the corrected Hall signal group. For example, the offset detecting circuit 12 can include a counter configured to count the first Hall signal H1 and the back EMF zero signal BEMF-WZC, respectively, to obtain positions of the first phase changing point P1 and the back EMF, respectively, and the phase difference X can be generated accordingly. The offset detecting circuit 12 can also include a phase adjustment circuit for adjusting the phase of the Hall signal group. In the above embodiment, the second Hall signal H2 and the third Hall signal H3 are generated from the real detection by using the Hall sensor 10, and the offset detecting circuit 12 can respectively detect the second phase changing point and the third phase changing point of the second Hall signal H2 and the third Hall signal H3, and can respectively detect the back EMF zero points of the corresponding back EMF signals in the calibration mode. Afterward, the individual phase differences can be further detected, and the phases of the second Hall signal H2 and the third Hall signal H3 can be individually adjusted. On the other hand, after adjusting the first Hall signal H1, the ideal second Hall signal H2 and the third Hall signal H3 can be generated in a simulating manner and to be incorporated into the corrected Hall signal group, and the driving circuit 14 can further generate corrected phase changing signals based on the corrected Hall signal group to drive the motor 11.

Therefore, the phase of the Hall signal can be automatically adjusted to eliminate the Hall element offset and reduce the feedback current according to the phase difference between the back EMF zero point and the Hall signal thorough the configuration mentioned above, thereby reducing the power consumption of the DC brushless motor and improving the efficiency of the motor.

Figure 6:
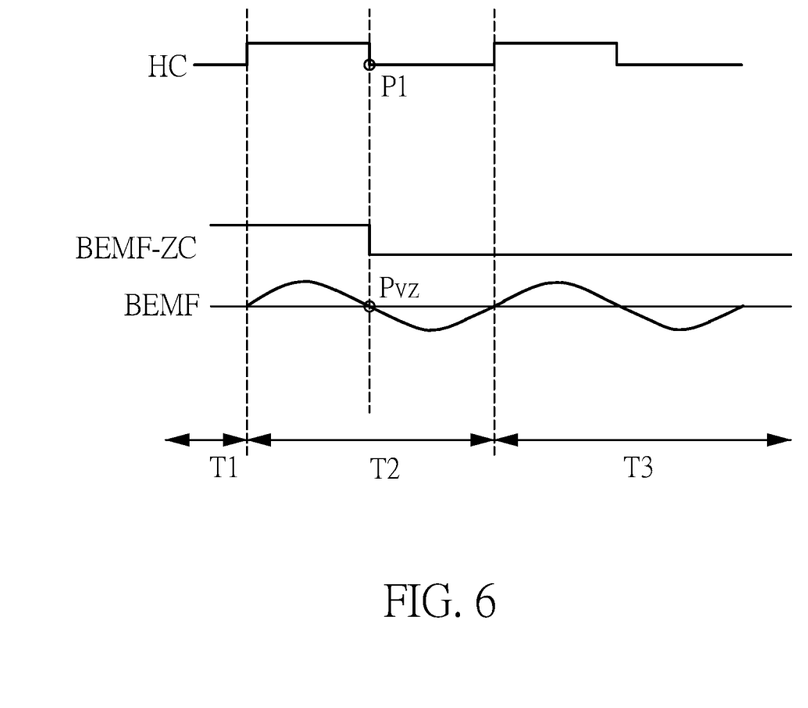
FIG. 6 is a diagram showing the relationship between a Hall signal, a back EMF signal, and a back EMF zero detection signal of a single-phase motor.

Reference is further made to FIG. 6, which is a diagram showing the relationship between the Hall signal, the back EMF signal, and the back EMF zero detection signal of a single-phase motor. The motor driving circuit of the present disclosure is also applicable to a single phase DC motor.

The driving circuit 16 of the single-phase DC motor can sense the magnetic pole position of a rotor in the single-phase DC motor by using the Hall element of the Hall sensor 10, and accordingly generate a Hall signal group. In this embodiment, the Hall signal group can only include the Hall signal HC. Next, the driving circuit 14 receives the Hall signal group to output switching signals to control the ON or OFF states of the respective switching elements in the inverter circuit 16. Thereafter, the inverter circuit 16 alternately outputs the first output signal and the second output signal to the single-phase DC motor to drive the single-phase DC motor to be rotated.

Similarly, the pre-operation mode and the correction mode can be sequentially entered to detect the phase offset required for correction. In the pre-operation mode, that is, in the interval T1, the driving circuit 14 outputs the aforementioned initial phase changing signal through the inverter circuit 16 to control the phase change state of the motor 11. At this time, the motor 11 operates in accordance with the initial phase changing signal and generates back EMFs on the coil windings of the respective phases.

Next, the correction mode is entered after the pre-operation mode, i.e. in the interval T2, the driving circuit 14 stops outputting the initial phase changing signal, in other words, all of the coil windings are floating, at which point the motor 11 still continues inertial operation, the back EMF zero point detector 18 receives the back EMF signal BEMF. The back EMF zero point detector 18 detects the back EMF zero point Pvz of the back EMF signal group and outputs a back EMF zero point signal. In this embodiment, after the first phase changing point P1, according to the configuration of the Hall sensor 10 in the single-phase motor, a back EMF zero point Pvz is expected to appear in the back EMF signal BEMF, as shown in FIG. 6. Here, as shown in FIG. 6, after detecting the back EMF zero point Pvz of the back EMF signal group, the back EMF zero point detector 18 generates a back EMF zero point signal BEMF-ZC. The offset detecting circuit 12 further detects the phase difference X between the first phase changing point P1 and the back EMF zero point Pvz according to the first changing point P1 and the back EMF zero point signal BEMF-ZC, and determines a difference value between the phase difference X and the predetermined phase difference. In the case of a single-phase motor, the predetermined phase difference will be zero, that is, the first phase changing point P1 needs to be the back EMF zero point Pvz. Thereafter, returning to the normal operation mode, that is, in the interval T3, the phase of the Hall signal group is adjusted according to the difference value to generate the corrected Hall signal group to output to the driving circuit 14. The phase of the Hall signal can be automatically adjusted to eliminate the Hall element offset and reduce the feedback current according to the phase difference between the back EMF zero point and the Hall signal thorough the configuration mentioned above, and the present disclosure is applicable to different motor configurations, such as single-phase and three-phase motors.

The spirit of the present disclosure is to utilize the phase changing point detected from the Hall signal and the corresponding back EMF zero point, and use the relationship between the two to find the phase shift caused by the mounting tolerance of the Hall element. Then, by using this phase shift, the Hall signal of the Hall sensor is phase-adjusted to find the optimal voltage driving phase, such that the current consumed by the motor is minimized.

This embodiment is merely illustrative of the core concept of the present disclosure, which will be described in more detail in the following embodiment(s) in accordance with the accompanying drawings.

Second Embodiment

Figure 7:
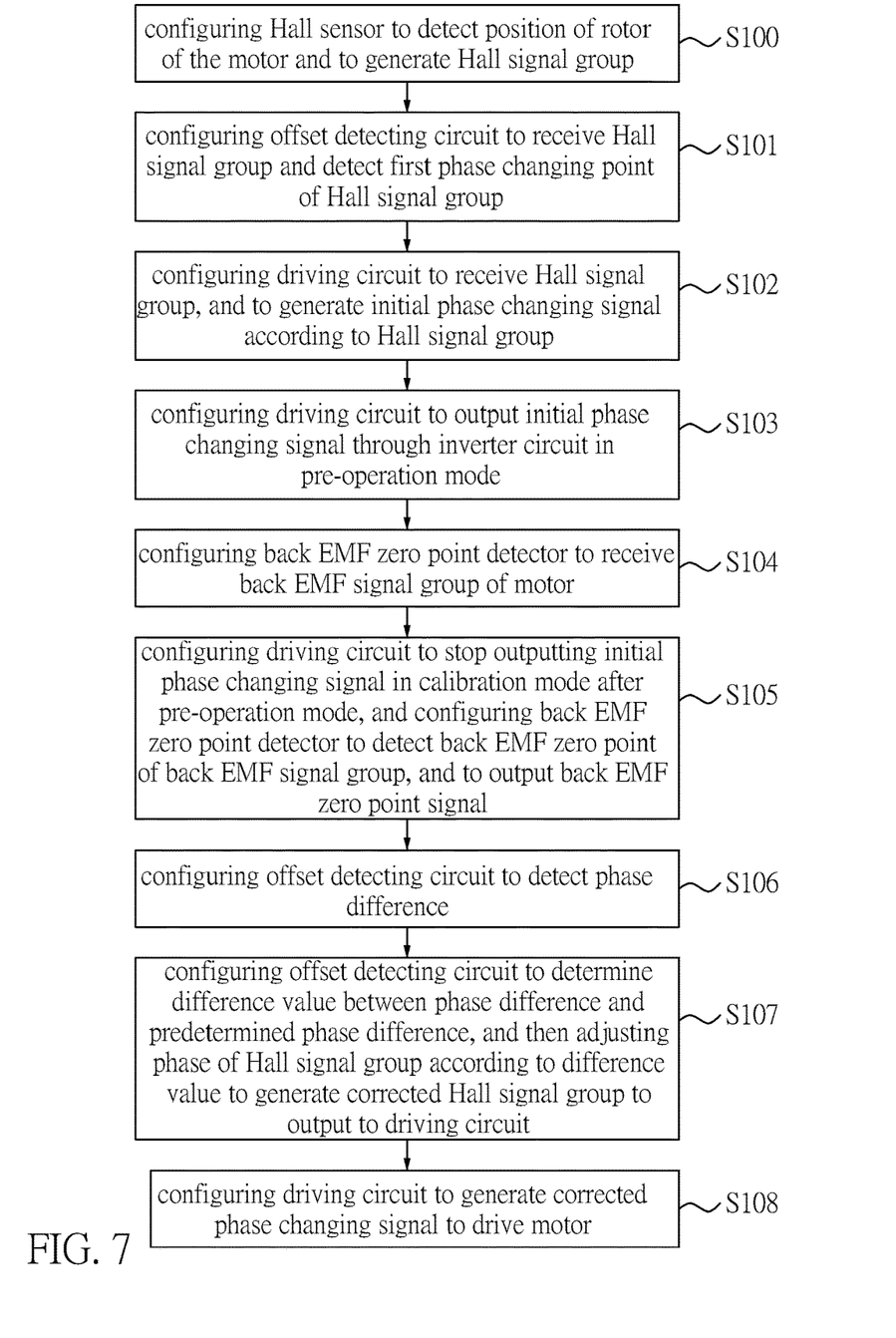
FIG. 7 is a flow chart showing a motor driving method according to a second embodiment of the present disclosure.

Reference is now made to FIG. 7, which is a flow chart showing a motor driving method according to a second embodiment of the present disclosure. The method according to the present embodiment can be performed in the motor driving circuit 1 shown in FIG. 1, and thus reference is also made to FIGS. 1 to 6 in order to facilitate understanding, and the motor driving method includes:

Step S100: configuring a Hall sensor to detect a position of a rotor of the motor and to generate a Hall signal group. The Hall signal group can have different numbers of Hall signals depending on whether the motor is a single-phase motor or a three-phase motor.

Step S101: configuring an offset detecting circuit to receive the Hall signal group and detect a first phase changing point of the Hall signal group.

Step S102: configuring a driving circuit to receive the Hall signal group, and to generate an initial phase changing signal according to the Hall signal group.

Step S103: configuring the driving circuit to output the initial phase changing signal through an inverter circuit in a pre-operation mode to control a phase change state of the motor to operate the motor according to the initial phase changing signal.

Step S104: configuring a back EMF zero point detector to receive a back EMF signal group of the motor.

Step S105: configuring the driving circuit to stop outputting the initial phase changing signal in a calibration mode after the pre-operation mode, and configuring the back EMF zero point detector to detect a back EMF zero point of the back EMF signal group, and to output a back EMF zero point signal.

Step S106: configuring the offset detecting circuit to detect a phase difference between the first phase changing point and the back EMF zero point according to the first phase changing point and the back EMF zero point signal.

Step S107: configuring the offset detecting circuit to determine a difference value between the phase difference and a predetermined phase difference, and then adjusting the phase of the Hall signal group according to the difference value to generate a corrected Hall signal group to output to the driving circuit.

Step S108: configuring the driving circuit to generate a corrected phase changing signal according to the corrected Hall signal group to drive the motor.

In the above embodiment, the Hall signals other than the first Hall signal can be generated from the real detection by using the Hall sensor, and the offset detecting circuit may respectively detect other phase changing points of other Hall signals, and can respectively detect the back EMF zero points of the corresponding back EMF signals in the calibration mode. Afterward, the individual phase differences can be further detected, and the phases of the second Hall signal H2 and the third Hall signal H3 can be individually adjusted. On the other hand, after adjusting the first Hall signal, other Hall signals can be generated in a simulating manner as ideal Hall signals and be incorporated into the corrected Hall signal group, and the driving circuit can further generate corrected phase changing signals based on the corrected Hall signal group to drive the motor.

Details regarding the steps of the motor driving method have been described in detail in the above-described embodiments of FIGS. 1 to 6, and are not described herein for brevity. It is to be noted that the steps of the embodiment of FIG. 7 are merely for convenience of description, and the embodiments of the present disclosure do not use the sequence of the steps as a limitation of the embodiments of the present disclosure.

Therefore, the phase of the Hall signal can be automatically adjusted to eliminate the Hall element offset and reduce the feedback current according to the phase difference between the back EMF zero point and the Hall signal though the steps mentioned above, thereby reducing the power consumption of the DC brushless motor and improving the efficiency of the motor. Moreover, the present disclosure is applicable to different motor configurations, such as single-phase and three-phase motors.

The spirit of the present disclosure is to utilize the phase changing point detected from the Hall signal and the corresponding back EMF zero point, and use the relationship between the two to find the phase shift caused by the mounting tolerance of the Hall element. Then, by using this phase shift, the Hall signal of the Hall sensor is phase-adjusted to find the optimal voltage driving phase, such that the current consumed by the motor is minimized.

One of advantages of the present disclosure is that the motor driving circuit provided by the present disclosure may be able to automatically adjust the phase of the Hall signal to eliminate the Hall element offset and reduce the feedback current according to the phase difference between the back EMF zero point and the Hall signal through the technical features of "offset detecting circuit" and the "back EMF zero point detector", thereby reducing the power consumptions of the DC brushless motor and improving the efficiency of the motor. Moreover, the present disclosure is applicable to different motor configurations, such as single-phase and three-phase motors.

The spirit of the present disclosure is to utilize the phase changing point detected from the Hall signal and the corresponding back EMF zero point, and use the relationship between the two to find the phase shift caused by the mounting tolerance of the Hall element. Then, by using this phase shift, the Hall signal of the Hall sensor is phase-adjusted to find the optimal voltage driving phase, such that the current consumed by the motor is minimized.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor driving circuit, electrically connected to a motor, comprising:
    a Hall sensor configured to detect a position of a rotor of the motor and generate a Hall signal group;
    an offset detecting circuit configured to receive the Hall signal group, and to detect a first phase changing point of the Hall signal group;
    a driving circuit electrically connected to the offset detecting circuit, and connected to the motor through an inverter circuit, the driving circuit configured to receive the Hall signal group, and to generate an initial phase changing signal according to the Hall signal group, wherein the driving circuit is configured to output the initial phase changing signal through the inverter circuit in a pre-operation mode to control a phase change state of the motor to cause the motor to operate according to the initial phase changing signal;
    a back electromotive force (EMF) zero point detector electrically connected to the offset detecting circuit and the motor, and configured to receive a back EMF signal group of the motor,
    wherein in a calibration mode, the driving circuit is configured to stop outputting the initial phase changing signal after the pre-operation mode is terminated, the back EMF zero point detector is configured to detect a back EMF zero point of the back EMF signal group, and to output a back EMF zero point signal,
    wherein in the calibration mode, the offset detecting circuit further detects a phase difference between the first phase changing point and the back EMF zero point associated with a mounting tolerance of the Hall sensor according to the first phase changing point and the back EMF zero point signal, determines a difference value between the phase difference and a predetermined phase difference, and then adjusts the phase of the Hall signal group according to the difference value to generate a corrected Hall signal group to output to the driving circuit,
    wherein the driving circuit generates a corrected phase changing signal according to the corrected Hall signal group to drive the motor.

2. The motor driving circuit according to claim 1, wherein the motor is a three-phase motor.

3. The motor driving circuit according to claim 2, wherein the Hall signal group comprises a first Hall signal, a second Hall signal and a third Hall signal, the offset detecting circuit receives the Hall signal group and detects the first phase changing point of the first Hall signal, and the back EMF signal group includes a first back EMF signal, the second back EMF signal and a third back EMF signal corresponding to the first Hall signal, the second Hall signal, and the third Hall signal, respectively, and the back EMF zero point corresponds to the third back EMF signal.

4. The motor driving circuit according to claim 1, wherein the motor is a single phase motor.

5. The motor driving circuit according to claim 4, wherein the Hall signal group includes a Hall signal, and the offset detecting circuit receives the Hall signal and detects the first phase changing point of the Hall signal.

6. A motor driving method for driving a motor, comprising:
    configuring a Hall sensor to detect a position of a rotor of the motor and to generate a Hall signal group;
    configuring an offset detecting circuit to receive the Hall signal group and detect a first phase changing point of the Hall signal group;
    configuring a driving circuit to receive the Hall signal group, and to generate an initial phase changing signal according to the Hall signal group;
    configuring the driving circuit to output the initial phase changing signal through an inverter circuit in a pre-operation mode, to control a phase change state of the motor to operate the motor according to the initial phase changing signal;

configuring a back electromotive force (EMF) zero point detector to receive a back EMF signal group of the motor;

configuring the driving circuit to stop outputting the initial phase changing signal in a calibration mode after the pre-operation mode, and configuring the back EMF zero point detector to detect a back EMF zero point of the back EMF signal group, and to output a back EMF zero point signal;

configuring the offset detecting circuit to detect a phase difference between the first phase changing point and the back EMF zero point associated with a mounting tolerance of the Hall sensor according to the first phase changing point and the back EMF zero point signal;

configuring the offset detecting circuit to determine a difference value between the phase difference and a predetermined phase difference, and then adjusting the phase of the Hall signal group according to the difference value to generate a corrected Hall signal group to output to the driving circuit; and configuring the driving circuit to generate a corrected phase changing signal according to the corrected Hall signal group to drive the motor.

7. The motor driving method according to claim 6, wherein the motor is a three-phase motor.

8. The motor driving method according to claim 7, wherein the Hall signal group includes a first Hall signal, a second Hall signal and a third Hall signal, the offset detecting circuit receives the Hall signal group and detects the first phase changing point of the first Hall signal, and the back EMF signal group includes a first back EMF signal, the second back EMF signal and a third back EMF signal corresponding to the first Hall signal, the second Hall signal, and the third Hall signal, respectively, and the back EMF zero point corresponds to the third back EMF signal.

9. The motor driving method according to claim 6, wherein the motor is a single phase motor.

10. The motor driving circuit according to claim 9, wherein the Hall signal group includes a Hall signal, and the offset detecting circuit receives the Hall signal and detects the first phase changing point of the Hall signal.

\* \* \* \* \*